Patented Nov. 21, 1950

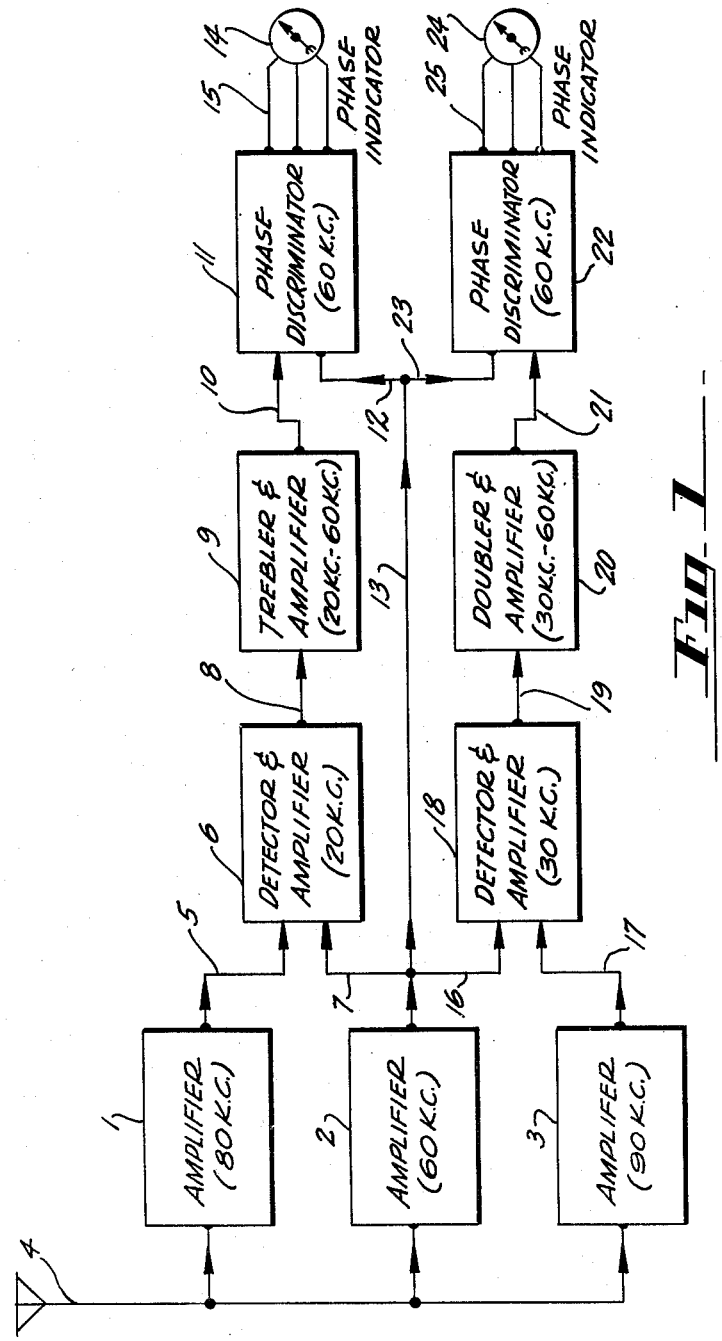

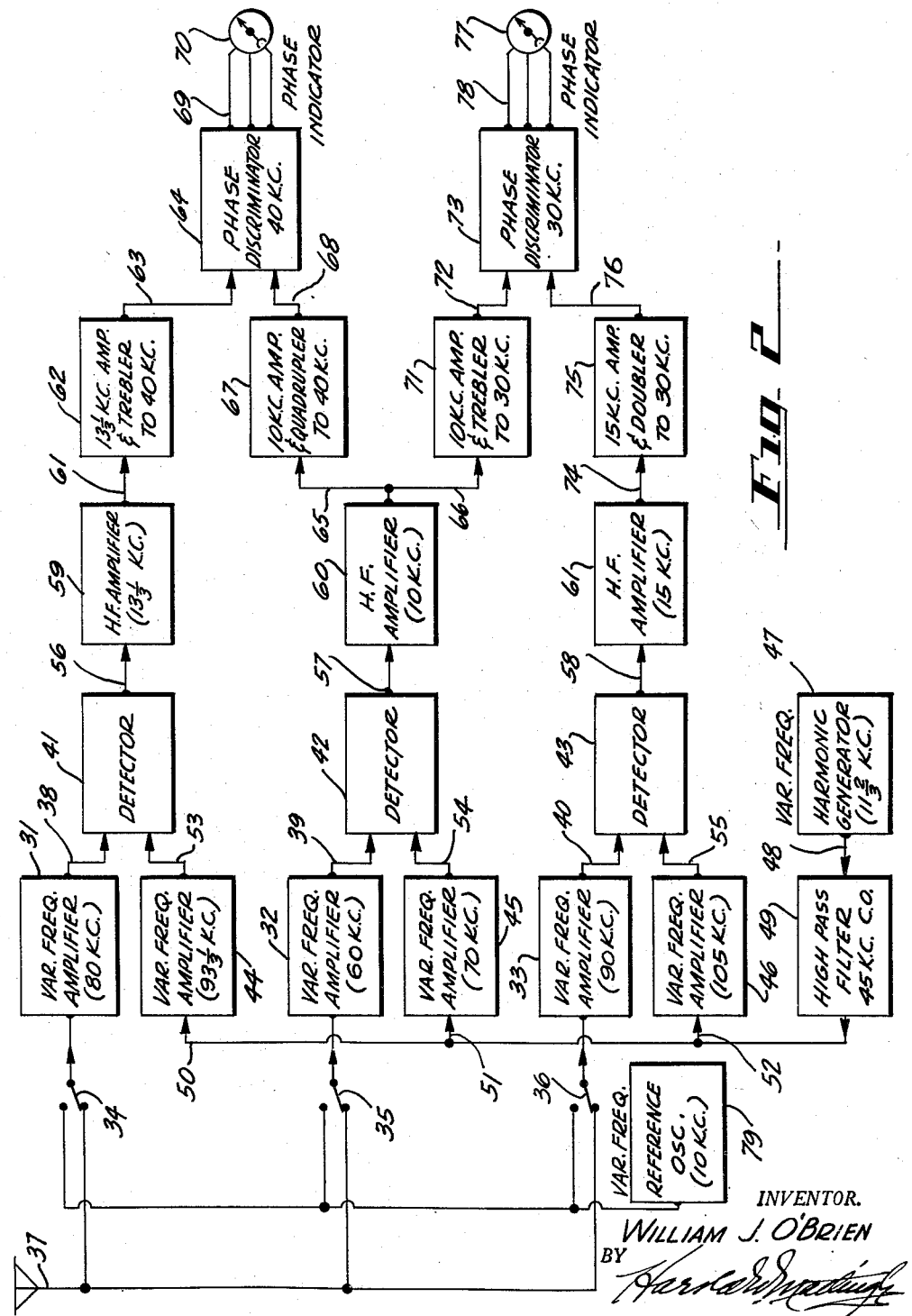

2,530,902

UNITED STATES PATENT OFFICE 2,530,902

RECEIVING APPARATUS FOR RADIO-FREQUENCY NAVIGATION SYSTEMS

William J. O'Brien, London, England, assignor to The Decca Record Company, Limited, London, England, a corporation of Great Britain Application August 27, 1945, Serial No. 612,997

5 Claims. (Cl. 343—105)

My invention relates to radio frequency navigational aids for determining and indicating the geographical location of a mobile vehicle and has particular reference to a novel form of receiving apparatus for use with navigational systems of the multiple equiphase displacement type.

In my copending application Serial No. 612,987, filed August 27, 1945, and entitled Navigation System, now abandoned, I have disclosed a radio frequency navigational system which operates to establish two intersecting coordinate systems defined by contours of equal phase displacement between interfering radio frequency fields of unlike but related frequencies. I have also disclosed in my copending application Serial No. 612,991, filed August 27, 1945; now Patent No. 2,500,200 issued March 14, 1950, and entitled Multiple Channel Radio Frequency Receiver, a receiving apparatus which may be used on the mobile vehicle to receive the transmissions from the navigational equipment and provide a continuous indication of the coordinate location of the vehicle. In the receiving apparatus described therein, the separately received signals are converted to a frequency equal to the least common multiple of the two frequencies the relative phase of which it is desired to determine. One possible objection to this mode of operation lies in the rather large amount of equipment required to effect the necessary frequency conversions. Also the apparatus disclosed is inherently of a fixed frequency type which, once installed, is suitable for use only on a single set of transmitting apparatus.

My first aforementioned copending application contemplates extending the coverage of the navigational system over extremely large areas by employing a plurality of individual systems of the type disclosed in that application and arranged to overlap their respective useful areas so as to extend the geographical coverage of the system. The mobile receiver in order to take advantage of the extended range and accuracy of such a system must be equipped with receiving means which will permit the proper one of the individual navigational systems to be selected out of the system network.

Because of the limitations above noted, the present invention is directed to a receiving apparatus which is simpler in construction than that which has been heretofore disclosed and which is provided with tuneable means permitting a user of the system to select any one of a group of navigational systems forming a system network.

It is therefore an object of my invention to provide a mobile receiving apparatus for use with navigational systems of the character above referred to and which operates to determine the relative phase relations at a frequency equal to a signal frequency transmitted by the transmitting apparatus.

It is an additional object of my invention to provide a receiving apparatus of the character above referred to which makes the phase comparison at the lowest signal frequency by heterodyning the two received frequencies of each coordinate system, multiplying the heterodyne frequencies to equality with the lowest signal frequency, and comparing the relative phase of the lowest signal frequency with each of the multiplied heterodyne frequencies.

It is also the object of my invention to provide in an apparatus of the character above referred to a means for determining the relative phase displacement between two received signals on the basis of a reference frequency equal to the least common multiple of the two signal frequencies.

It is a still further object of my invention to provide an apparatus of the nature above set forth in which means is provided for tuning the receiving apparatus to allow users of the system to choose one coordinate system out of a plurality of such systems produced by the operation of the navigational system network.

It is an additional object of my invention to provide a receiving apparatus of the character set forth in the preceding paragraphs which operates on a heterodyne principal permitting the use of heterodyne frequency amplifiers which may be so constructed as to provide a high gain and excellent phase stability.

Other objects and advantages of my invention will be apparent from a study of the following specification read in connection with the accompanying drawings, wherein:

Fig. 1 is a block diagram illustrating the components employed and the manner of their interconnection to permit receiving radio frequency navigational signals and making a phase comparison between the received signals at a frequency equal to the lowest transmitted frequency; and Fig. 2 is a block diagram similar to Fig. 1 but illustrating a tuneable receiving apparatus which works into fixed heterodyne frequency amplifiers arranged to make the phase comparison at frequencies lower than the lowest transmitted frequency.

Referring to the drawings, I have illustrated in Fig. 1 by diagrammatical means the apparatus employed in one embodiment of my invention to provide a fixed frequency mobile receiving apparatus suitable for use with a radio frequency navigational system of the character disclosed in my first aforementioned copending application. The equipment includes three radio frequency amplifiers 1, 2 and 3 which are each coupled by suitable means to a receiving antenna 4. The amplifiers 1, 2 and 3 are tuned respectively to the three different but related frequencies transmitted by the navigational system and operating to establish the intersecting equiphase displacement coordinate system. For the purposes of illustration frequencies of 80, 60 and 90 kilocycles have been selected.

The operating frequencies of the various portions of the apparatus have been indicated in Fig. 1 by frequency notations enclosed in parenthesis. It will be appreciated that the specified frequencies are those corresponding to the assumed transmission frequencies of 80, 60 and 90 kilocycles and that other frequencies will be employed whenever the transmitting equipment is operated at frequencies other than those assumed.

The amplifier 1 is coupled as indicated at 5 to one input of a mixer and detector circuit 6, the other input thereof being coupled as indicated at 7 to the output of the amplifier 2. The mixing of the 80 and 60 kilocycle signals thus impressed upon the detector circuit 6 and the ensuing rectification of those signals results in a 20 kilocycle heterodyne frequency. This is amplified within the detector and amplifier 6 and coupled as indicated at 8 to a frequence trebler and 60 kilocycle amplifier 9 operating to convert the 20 kilocycle input into a 60 kilocycle output. This output is coupled as indicated at 10 to one input of a phase discriminator circuit 11. The other input of the discriminator 11 is connected as indicated at 12 and 13 to the output of the amplifier 2 which also comprises a 60 kilocycle signal.

The phase discriminator 11 operates to compare the phase relation between the 60 kilocycle signal received from the frequency trebler 9 and that received from the amplifier 2 and the result of this comparison is indicated as a phase angle by a phase angle indicator 14 coupled as indicated at 15 to the output of the phase discriminator 11.

In a similar way the outputs of amplifiers 2 and 3 are coupled as indicated at 16 and 17 to the input circuits of a detector and 30 kilocycle amplifier 18. The rectification of the two signals results in a heterodyne frequency of 30 kilocycles which is coupled as indicated at 19 to a frequency doubler and 60 kilocycle amplifier 20 operating to convert the 30 kilocycle input to a 60 kilocycle output. This output is coupled as indicated at 21 to one input of a second phase discriminator 22 the other input of which is connected as indicated at 23 and 13 to the output of a 60 kilocycle amplifier 2.

The phase discriminator 22 operates to measure the phase relation between the 60 kilocycle signal received from amplifier 2 and the 60 kilocycle converted frequency received from the doubler 20. The result of this comparison is indicated as a phase angle on a phase angle indicator 24 coupled as indicated at 25 to the output of the phase discriminator 22.

With respect to the apparatus mentioned in the foregoing description, the amplifiers, detectors, frequency converters, phase discriminators and phase indicators may be of any suitable type. However, for the phase discriminators 11 and 22 a preference is expressed for the apparatus disclosed in my copending application Serial No. 612,991, filed August 27, 1945, and entitled Multiple Channel Radio Frequency Receiver, and for a phase indicator a preference is expressed for a goniometer of the character disclosed in my copending application Serial No. 612,984, filed August 27, 1945, now Patent No. 2,499,326 issued February 28, 1950, and entitled Registering Goniometer.

Attention is directed to the fact that the phase discriminators 11 and 22 both make the required phase comparison at a frequency equal to the lowest frequency transmitted by the navigational system. It is also to be noted that the result of the phase determination which is indicated on the indicators 14 and 24 is the relative phase between the two pair of navigational signals as measured on the basis of a reference frequency equal to the least common multiple of the respective transmitted frequencies. This may be explained as follows:

Assume that a phase of advancement of four degrees occurs in the 80 kilocycle signal with no phase shift occurring in the 60 kilocycle signal as, for example, through movement of the mobile receiver in a circular path at a fixed distance from the 60 kilocycle transmitting antenna. The least common multiple reference frequency for the 60 and 80 kilocycle signals is 240 kilocycles or three times the 80 kilocycle signal. Therefore, the phase shift at the reference frequency of 240 kilocycles will be a phase advancement of twelve degrees or three times the actual advancement of the 80 kilocycle signal. The mixing of the 80 and 60 kilocycle signals in the detector circuit 6 produces an advancement of four degrees in the 20 kilocycle signal passed to the frequency trebler 9. The result of the frequency conversion is to advance the phase of the resulting 60 kilocycle signal three times as much as the advancement of the 20 kilocycle or a net advancement of twelve degrees. Therefore, the phase advancement of the 60 kilocycle signal applied to the phase discriminator 11 by means of the coupling 10 is twelve degrees, whereas no shift occurs in the signal coupled as indicated at 12 and 23. The indicated phase shift on the indicator 14 will accordingly be an advancement of twelve degrees.

Similarly if the phase of the 60 kilocycle signal received by the amplifier 2 advances three degrees while the phase of the 90 kilocycle signal received by the amplifier 3 remains constant the indicated phase shift at the lowest common multiple frequency of 180 kilocycles will be nine degrees. A three degree advancement of the phase of the 60 kilocycle signal results in a three degree retardation of the phase of the 30 kilocycle signal which is passed to the frequency doubler 20. The frequency doubling effected by this circuit produces a phase retardation of six degrees in the 60 kilocycle output applied as indicated at 21 to one input of the phase discriminator 22. The other input of the phase discriminator 22 is coupled directly to the output of the amplifier 2 and the 60 kilocycle signal thus applied to the phase discriminator 22 is advanced three degrees. The net effect of the three degree advancement in one signal and a six degree retardation in the other produces an indicated phase shift of nine degrees in the advancing direction of the 60 kilocycle signal with respect to the 90 kilocycle signal.

In Fig. 2 I have disclosed a modified form of the invention directed particularly to a tuneable receiving apparatus permitting the use of the receiving equipment with different groups of radio frequency transmitters serving as individual navigational systems in a chain or network of such systems. The apparatus which is illustrated in Fig. 2 includes variable frequency amplifiers 31, 32 and 33 the inputs of which are connected respectively through single-pole double-throw switches 34, 35 and 36 to a suitable receiving antenna 37. As in the previously described modification of the invention it is assumed that the transmitting apparatus to which the equipment is tuned is operated respectively at 80, 60 and 90 kilocycles. It will be shown subsequently that other frequencies may also be used providing the proper harmonic relation is maintained.

The output of the amplifiers 31, 32 and 33 are respectively coupled as indicated at 38, 39 and 40 to mixing and detecting circuits 41, 42 and 43. Associated respectively with the amplifiers 31, 32 and 33 are variable frequency amplifiers 44, 45 and 46. These amplifiers are coupled to be excited from a harmonic generator 47 the output of which is coupled as indicated at 48 through a high pass filter 49 having a lower cutoff frequency of the order of magnitude of 45 kilocycles. The high frequency signals passed by the filter 49 are coupled as indicated at 50, 51 and 52 to the input circuits respectively of the amplifiers 44, 45 and 46.

The amplifiers 44, 45 and 46 are preferably of the regenerative type designed to produce an output signal as closely approaching a sinusoidal wave form as possible. If desired the amplifiers may be made regenerative to such an extent as to be self-oscillating. The outputs of these amplifiers are respectively coupled as indicated at 53, 54 and 55 to the input circuits of the detectors 41, 42 and 43 within which circuits the signals of different frequency are mixed and rectified to produce output frequencies equal to the difference between the two input frequencies.

In accordance with the assumed example the harmonic generator preferably operates at a fundamental frequency of 11⅔ kilocycles with the amplifiers 44, 45 and 46 being tuned respectively to the eighth, sixth and ninth harmonics of the fundamental frequency of the harmonic generator. The amplifier 44 is, therefore, tuned to 93⅓ kilocycles, the amplifier 45 is tuned to 70 kilocycles and the amplifier 46 is tuned to 105 kilocycles. As a result the output frequencies of the detectors 41, 42 and 43 are respectively 13⅓ kilocycles, 10 kilocycles and 15 kilocycles.

The detectors are coupled as indicated at 56, 57 and 58 to heterodyne frequency amplifiers 59, 60 and 61 adjusted respectively to operate at fixed frequencies of 13⅓, 10 and 15 kilocycles. The 13⅓ kilocycle output of the heterodyne frequency amplifier 59 is coupled as indicated at 61 to an amplifier and frequency trebler 62 operating to produce a 40 kilocycle output signal which is applied as indicated at 63 to one input circuit of a phase discriminator 64. The 10 kilocycle output of the heterodyne frequency amplifier 60 is divided as indicated at 65 and 66 and one half of the output is applied to the input of a 10 kilocycle amplifier and frequency quadrupler 67 operating to convert the 10 kilocycle input into a 40 kilocycle output, which output is applied as indicated at 68 to the other input circuit of the phase discriminator 64. The output of the phase discriminator 64 is coupled as indicated at 69 to a phase angle indicator 70 serving to indicate the relative phase relation between the two 40 kilocycle signals applied to the discriminator 64.

The other half of the 10 kilocycle output of the heterodyne frequency amplifier 60 is applied as indicated at 66 to a 10 kilocycle amplifier and frequency trebler 71 operating to convert the 10 kilocycle input into a 30 kilocycle output. This output is applied as indicated at 72 to one input circuit of a 30 kilocycle phase discriminator 73. The 15 kilocycle output of the heterodyne frequency amplifier 61 is coupled as indicated at 74 to a 15 kilocycle amplifier and frequency doubler 75 serving to produce an output frequency of 30 kilocycles which is coupled as indicated at 76 to the other input circuit of the phase discriminator 73. The phase discriminator operates to measure the phase relation between the two 30 kilocycle input signals and to indicate by means of a phase indicator 77 coupled to the discriminator 73 as indicated at 78 the result of the determination of the phase angle between the two input signals.

As in the previously described modification of my invention and for the reasons explained in connection therewith the phase indication given by the indicators 70 and 77 are the phase relationships between the corresponding input signals as measured on the basis of reference frequency equal to the least common multiple of the two transmitted frequencies.

In accordance with the present modification of the invention the amplifiers 31–33 and 44–46 and the harmonic generator 47 are tuneable so that they may be used to select transmissions from other antennae at frequencies different from the 80, 60, and 90 kilocycle signals used in the assumed example. To simplify the tuning of the system to other transmitters, the tuning controls for the amplifiers and harmonic generator will, by preference, be ganged on a single control.

Assuming that the new transmitters desired to be received are operating on 88, 66 and 99 kilocycles respectively, the tuning control used would be advanced to tune the amplifiers 31, 32 and 33 respectively to these frequencies. At the same time the frequency of the harmonic generator 47 would be raised to 12⅔ kilocycles. The tuning change of the amplifiers 44, 45 and 46 would be to resonance with the eighth, sixth and ninth harmonics of the 12⅔ kilocycle fundamental as before, in other words to frequencies of 101⅓, 76 and 114 kilocycles. The resulting heterodyne frequencies are, therefore, unchanged, being, respectively 13⅓, 10 and 15 kilocycles.

In addition to the foregoing I prefer to provide a means for periodically checking the operation of the system to detect any spurious and unwanted phase shifts which may creep into the various circuits. For this reason I employ also a reference oscillator 79 normally operating on a 10 kilocycle fundamental signal to produce an output which is rich in harmonics so that by throwing the switches 34, 35 and 36 to positions alternate to those shown on Fig. 2 the output of the oscillator 79 may be coupled to the input circuits of the amplifiers 31, 32 and 33 so that they may amplify the eighth, sixth and ninth harmonics respectively of the reference oscillator output. The reference oscillator is preferably of a type which produces an output rich in the higher harmonics and in which the multiple phase relation between these harmonics is fixed and unchanging. During final testing and adjustment following construction, the various circuit components are preferably adjusted to give a zero reading on the two phase indicators 70 and 77 when the reference oscillator 79 is connected to the amplifier inputs. Whenever at subsequent times the switches 34–36 are turned to the alternate positions the phase indicators 70 and 77 should read zero and any deviation from this standard reference reading constitutes an indication that some part of the apparatus requires adjustment.

The reference oscillator 79 is also made of the adjustable frequency type so that in the event the amplifier tuning is changed as described in the preceding paragraphs to other frequencies, such as 38, 66 and 99 kilocycles, the oscillator frequency may be similarly changed to 11 kilocycles to permit a check on the operation of the system to be made at the new frequency.

In the foregoing description, reference has been made to the reference oscillator 79 and the harmonic generator 47 as operating at a relatively low frequency fundamental and capable of producing an output rich in the higher harmonics. Any suitable oscillator or harmonic generator having these properties may be employed. However, I prefer to use a signal generator of the type disclosed in my copending application Serial No. 612,983, filed August 27, 1945, now Patent No. 2,524,677 issued October 3, 1950, and entitled "Signal Generator."

The phase discriminators 64 and 73 and the phase indicators 70 and 77 also may be of any suitable type, but a preference is expressed for the types shown respectively in my copending applications Serial No. 612,991, filed August 27, 1945, and entitled Multiple Channel Radio Frequency Receiver, and Serial No. 612,984, filed August 27, 1945, and entitled Registering Goniometer.

Attention is directed to the fact that with the embodiment of my invention which has been described in the immediately foregoing paragraphs, the tuning of the apparatus may be changed as desired to permit one group of navigational system transmitters to be selected out of a plurality of such groups which may be arranged as a chain or network of navigational systems to cover extremely large areas. It will be noted that the principal amplifying function of the receiving apparatus is done in the heterodyne frequency amplifiers, and that these amplifiers may be of the fixed frequency type permitting high gain to be realised and permitting great phase stability to be readily obtained and easily maintained.

Attention is also directed to the fact that in both of the modifications of my invention which have been described herein the phase comparison is made at frequencies equal to or lower than the lowest frequency transmitted by the navigational system transmitters and that regardless of the frequency at which the phase comparison is made, the phase relation which is indicated by the phase indicators is that which corresponds to a phase measurement made at a frequency equal to the lowest common multiple of the unlike frequencies whose multiple phase relation is to be determined.

While I have shown and described the preferred embodiment of my invention I do not desire to be limited to the details of construction shown and described herein, except as defined in the appended claims.

I claim:

1. In a receiving apparatus for use with a radio frequency navigational system operating to transmit from spaced points a pair of radio frequency signals of unlike but related frequencies bearing a fixed multiple phase relation to each other, the combination of: a pair of radio frequency receivers tuned respectively to the frequencies of said signals; means for combining and rectifying the combined outputs of said receivers to produce a heterodyne frequency equal to the difference between said frequencies; frequency multiplying means for converting said heterodyne frequency to equality with one of said signal frequencies; and means for measuring and indicating the phase relation between said converted frequency and said one frequency.

2. In a receiving apparatus for use with a radio frequency navigational system operating to transmit from spaced points a pair of radio frequency signals of unlike but related frequencies bearing a fixed multiple phase relation to each other, the combination of: a pair of radio frequency receivers tuned respectively to the frequencies of said signals; means for combining and rectifying the combined outputs of said receivers to produce a heterodyne frequency equal to the difference between said frequencies; frequency multiplying means for converting said heterodyne frequency to equality with the lowest one of said signal frequencies; and means for measuring and indicating the phase relation between said converted frequency and said lowest frequency.

3. The method of determining the multiple phase relation between two radio frequency signals of unlike but related frequencies which includes the steps of deriving a beat note equal in frequency to the difference between said two frequencies, converting the frequency of said beat note to equality with one of said frequencies, and measuring the phase relation between said one frequency and said converted frequency.

4. The method of determining the multiple phase relation between two radio frequency signals of unlike but related frequencies which consists in receiving, mixing and rectifying said signals to produce an output frequency equal to the difference between said two frequencies, multiplying said output frequency to a converted frequency equal to the frequency of one of said two signals, measuring the phase relation between said converted frequency and said one signal, and continuously indicating the result of said measurement.

5. In a receiving apparatus for use with a radio frequency navigation system operating to transmit from spaced points a pair of radio frequency signals of unlike but related frequencies bearing a fixed multiple phase relation to each other, the combination of: means for receiving both of said signals and producing an output potential having a frequency equal to the difference between said signal frequencies; means for converting the frequency of said output potential to equality with one of said signals; and means for measuring the phase relation between said converted output potential and said one of said signals.

WILLIAM J. O'BRIEN.

REFERENCES CITED

The following references are of record in the file of this patent:

UNITED STATES PATENTS

| Number | Name | Date |
|---|---|---|
| 2,144,203 | Shanklin | Jan. 17, 1939 |
| 2,252,699 | Byrne | Aug. 19, 1941 |
| 2,408,773 | Goodall | Oct. 8, 1946 |

FOREIGN PATENTS

| Number | Country | Date |
|---|---|---|
| 547,183 | Great Britain | Aug. 17, 1942 |